United States Patent
Holla et al.

(10) Patent No.: US 11,025,546 B2
(45) Date of Patent: Jun. 1, 2021

(54) SELECTION OF PAIRED TRANSMIT QUEUE

(71) Applicant: VMware, Inc., Palo Alto, CA (US)

(72) Inventors: Aditya G. Holla, Palo Alto, CA (US); Wenyi Jiang, Fremont, CA (US); Rajeev Nair, Newark, CA (US); Srikar Tati, Mountain View, CA (US); Boon Ang, Saratoga, CA (US); Kairav Padarthy, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/045,690

(22) Filed: Jul. 25, 2018

(65) Prior Publication Data

US 2020/0036636 A1 Jan. 30, 2020

(51) Int. Cl.
| | |
|---|---|
| *H04L 12/743* | (2013.01) |
| *H04L 12/803* | (2013.01) |
| *H04L 12/861* | (2013.01) |
| *H04L 12/863* | (2013.01) |
| *H04L 29/06* | (2006.01) |
| *H04L 12/935* | (2013.01) |
| *H04L 12/931* | (2013.01) |

(52) U.S. Cl.
CPC ........ *H04L 47/125* (2013.01); *H04L 45/7453* (2013.01); *H04L 47/6215* (2013.01); *H04L 49/3009* (2013.01); *H04L 49/50* (2013.01); *H04L 69/22* (2013.01)

(58) Field of Classification Search
None
See application file for complete search history.

(56) References Cited

U.S. PATENT DOCUMENTS

| | | |
|---|---|---|
| 7,936,770 B1 | 5/2011 | Frattura et al. |
| 2010/0064286 A1 | 3/2010 | Pinter et al. |
| 2011/0142064 A1 | 6/2011 | Dubai et al. |
| 2011/0153935 A1* | 6/2011 | Li ........................ H04L 45/00 711/118 |
| 2013/0343399 A1 | 12/2013 | Kandula et al. |

(Continued)

OTHER PUBLICATIONS

Author Unknown, "NSX-T Networking Best Practices," NSX-T 1.1, Month Unknown 2017, 21 pages, VMware, Inc., Palo Alto, CA, U.S.A.

(Continued)

*Primary Examiner* — Duc T Duong
(74) *Attorney, Agent, or Firm* — Adeli LLP

(57) ABSTRACT

Some embodiments provide a method for selecting a transmit queue of a network interface card (NIC) of a host computer for an outbound data message. The NIC includes multiple transmit queues and multiple receive queues. Each of the transmit queues is individually associated with a different receive queue, and the MC performs a load balancing operation to distribute inbound data messages among multiple receive queues. The method extracts a set of header values from a header of the outbound data message. The method uses the extracted set of header values to identify a receive queue which the NIC would select for a corresponding inbound data message upon which the NIC performed the load balancing operation. The method selects a transmit queue associated with the identified receive queue to process the outbound data message.

24 Claims, 8 Drawing Sheets

(56) References Cited

U.S. PATENT DOCUMENTS

| | | | |
|---|---|---|---|
| 2014/0059111 A1* | 2/2014 | Veeraiyan | H04L 12/4633 709/201 |
| 2014/0122634 A1* | 5/2014 | Conner | G06F 13/4027 709/212 |
| 2014/0254594 A1* | 9/2014 | Gasparakis | H04L 45/74 370/392 |
| 2015/0055456 A1* | 2/2015 | Agarwal | H04L 49/9047 370/230 |
| 2015/0055457 A1 | 2/2015 | Agarwal et al. | |
| 2015/0055468 A1 | 2/2015 | Agarwal et al. | |
| 2015/0261556 A1 | 9/2015 | Jain et al. | |
| 2015/0263974 A1* | 9/2015 | Jain | H04L 47/621 370/229 |
| 2016/0092258 A1 | 3/2016 | Mehta et al. | |
| 2017/0005931 A1* | 1/2017 | Mehta | H04L 45/7453 |
| 2017/0187640 A1 | 6/2017 | Vasudevan et al. | |
| 2017/0353391 A1* | 12/2017 | Piecuch | H04L 47/521 |
| 2018/0159771 A1* | 6/2018 | Malloy | H04L 45/7453 |
| 2018/0285151 A1* | 10/2018 | Wang | G06F 9/5083 |
| 2019/0036894 A1* | 1/2019 | Wang | H04L 63/0485 |
| 2019/0281018 A1* | 9/2019 | Zhu | H04L 61/6063 |
| 2019/0334829 A1 | 10/2019 | Holla et al. | |
| 2020/0028792 A1* | 1/2020 | Holla | H04L 47/125 |
| 2020/0036646 A1* | 1/2020 | Mathew | H04L 45/16 |

OTHER PUBLICATIONS

Author Unknown, "RSS and Multiqueue Support in Linux Driver for VMXNET3," 2020567, Dec. 9, 2015, 3 pages, VMware, Inc.
Author Unknown, "What is Numa?," vSphere 4.1—ESX and vCenter—vSphere Resource Management Guide: Using NUMA Systems with ESX/ESXi, Nov. 29, 2017, 1 page, VMware, Inc.
Non-published commonly owned U.S. Appl. No. 16/867,855, filed May 6, 2020, 27 pages, Nicira, Inc.

* cited by examiner

| RX Queue | 0 | 1 | 2 | 3 | 0 | 1 | 2 | 3 | ... | 2 | 3 |
|---|---|---|---|---|---|---|---|---|---|---|---|
| Hash Index | 0 | 1 | 2 | 3 | 4 | 5 | 6 | 7 | ... | 14 | 15 |

SELECTION OF PAIRED TRANSMIT QUEUE

BACKGROUND

For data messages exchanged between a network and virtual machines executing on a host computer, it is preferable for the physical network interface card (PNIC) of the host computer to pair a hardware transmit queue with a hardware receive queue, so inbound and outbound data messages are processed with the same CPU. After receiving data messages for a virtual machine on a receive queue, the virtualization software executing the virtual machines selects the paired transmit queue when processing outbound traffic from the same virtual machine. However, when multiple hardware receive queues are used for increasing data throughput to a virtual machine, the virtualization software is unable to determine which hardware queue was used for each data message.

BRIEF SUMMARY

Some embodiments of the invention provide a novel method for selecting a hardware transmit queue of a physical network interface card (PNIC) of a host computer for data messages sent from a data compute node (DCN) executing on the host computer. The PNIC has multiple hardware queues to transmit and receive data messages (e.g., Internet Protocol (IP) packets) sent to and from the DCNs (e.g., virtual machines (VMs)) that execute on the host computer. In some embodiments, virtualization software of the host computer on which the DCNs execute processes the data messages between the PNICs and the source/destination DCNs.

In some embodiments, the transmit and receive hardware queues are paired, so that inbound and outbound data messages using the same receive and transmit queue pair are processed using the same CPU or CPU core, and thereby share the same interrupt service routine and local cache (and can thus be processed more efficiently). However, some DCNs have high throughput requirements, which cannot be met using a single receive queue. For instance, a DCN that is used for streaming video applications might have higher throughput requirements than a web server hosting text-based web pages. In order to increase throughput of data messages delivered to such DCNs, the PNIC of some embodiments supports load balancing features to distribute inbound data messages across multiple hardware queues (e.g., Receive Side Scaling (RSS)). In these techniques, the PNIC uses a specific algorithm to calculate a hash of a set of values extracted from an inbound data message. The calculated hash is used to select a hardware receive queue from a group of receive queues to which data messages for the destination DCN are assigned. However, this load balancing technique means that for outbound data messages, the virtualization software does not have the necessary information to determine which transmit queue to select for outbound data messages from a DCN, as inbound messages for that DCN are processed by multiple different receive queues.

The method of some embodiments selects a transmit queue for an outbound data message by identifying the paired receive queue that would be used for an inbound data message corresponding to the outbound data message. For example, in some embodiments the outbound data message is a packet belonging to an outbound flow, and the corresponding inbound data message is a packet belonging to a symmetric inbound flow.

In some embodiments, the receive queue for the corresponding inbound data message is determined using a hash value that is computed from a set of packet header values extracted from the outbound data message. Some embodiments use the 5-tuple that defines a data flow, which includes source and destination IP addresses, source and destination transport layer ports, and the transport layer protocol (e.g., TCP, UDP, etc.). For outgoing data messages, the source and destination header values are swapped and then a reverse hash is calculated using the same specific algorithm as used by the PNIC. The reverse hash (i.e., with the source and destination values swapped so as to match the incoming data messages) is used to lookup the receive queue for the corresponding inbound data message in an indirection table, which stores the hash values of inbound packets and their selected receive queue identifiers. Once the receive queue for the corresponding inbound data message is identified, the virtualization software selects the transmit queue paired with the identified receive queue for the outbound data message.

The PNIC populates the indirection table as inbound data messages are received from the network in some embodiments. The PNIC calculates the hash for each inbound data message and uses this hash to select a corresponding receive queue. The PNIC also stores the calculated hash and an identifier for the selected receive queue in the indirection table by the PNIC, and stores the calculated hash in the metadata of the inbound data message for the virtualization software to read upon receiving the data message from the PNIC. In addition, the PNIC provides the updated indirection table to the virtualization software, so that the virtualization software can use the indirection table updates for selecting transmit queues.

In other embodiments, rather than the virtualization software calculating the reverse hash for each outgoing data message, the virtualization software looks up the reverse hash in a flow cache table. The extracted header values are matched to an entry of the flow cache table storing the desired hash, which can then be used to identify a receive queue from the indirection table and select a transmit queue as in the description above. The flow cache table contains at least two entries for each hash value, one corresponding to an incoming data message and another corresponding to an outgoing data message. Accordingly, there is no need to calculate the reverse hash, since the reverse hash is obtained by simply matching the extracted set of values to an entry in the flow cache table. In addition, there is no need to swap the source and destination information, since there are entries for both the inbound and outbound cases.

The flow cache table is populated by the virtualization software in some embodiments when inbound data messages are received from the PNIC. The hash value calculated by the PNIC for the inbound data message is extracted from the associated metadata, which the PNIC would have stored as noted above. The set of values used to calculate the hash, including source and destination information, are also extracted from the data message, and both the calculated hash value and the set of values are stored in the flow cache table. Additionally, the source and destination information are swapped, and the set of values with swapped information is also stored in the flow cache table along with the same calculated hash.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
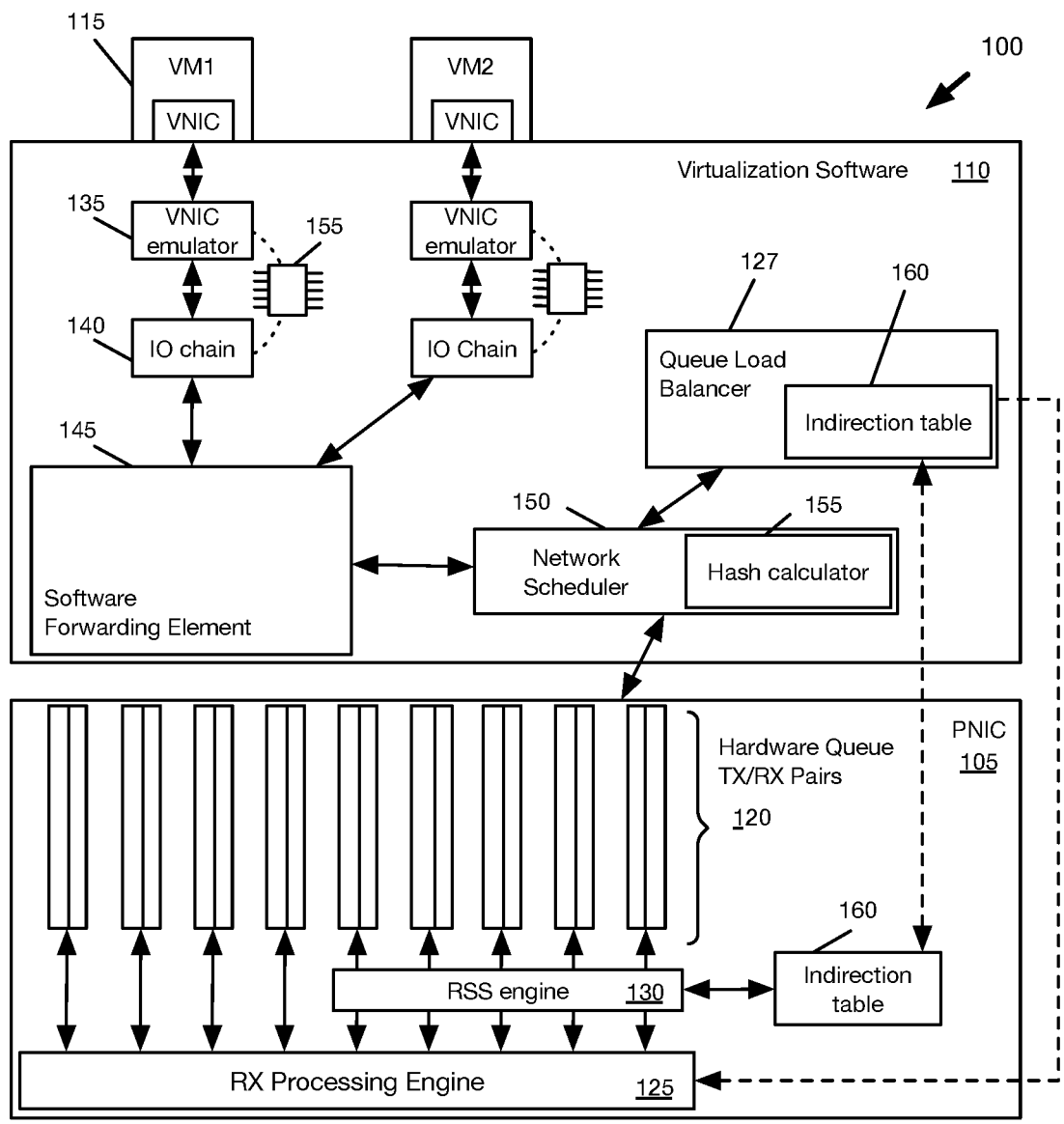
FIG. 1 conceptually illustrates a host computer of some embodiments that includes a PNIC with multiple hardware transmit/receive queue pairs.

Some embodiments of the invention provide a novel method for selecting a hardware transmit queue of a physical network interface card (PNIC) of a host computer for data messages sent from a data compute node (DCN) executing on the host computer. The PNIC has multiple hardware queues to transmit and receive data messages (e.g., Internet Protocol (IP) packets) sent to and from the DCNs (e.g., virtual machines (VMs)) that execute on the host computer. In some embodiments, virtualization software of the host computer on which the DCNs execute processes the data messages between the PNICs and the source/destination DCNs.

In some embodiments, the transmit and receive hardware queues are paired, so that inbound and outbound data messages using the same receive and transmit queue pair are processed using the same CPU or CPU core, and thereby share the same interrupt service routine and local cache (and can thus be processed more efficiently). However, some DCNs have high throughput requirements, which cannot be met using a single receive queue. For instance, a DCN that is used for streaming video applications might have higher throughput requirements than a web server hosting text-based web pages. In order to increase throughput of data messages delivered to such DCNs, the PNIC of some embodiments supports load balancing features to distribute inbound data messages across multiple hardware queues (e.g., Receive Side Scaling (RSS)). In these techniques, the PNIC uses a specific algorithm to calculate a hash of a set of values extracted from an inbound data message. The calculated hash is used to select a hardware receive queue from a group of receive queues to which data messages for the destination DCN are assigned. However, this load balancing technique means that for outbound data messages, the virtualization software does not have the necessary information to determine which transmit queue to select for outbound data messages from a DCN, as inbound messages for that DCN are processed by multiple different receive queues.

The method of some embodiments selects a transmit queue for an outbound data message by identifying the paired receive queue that would be used for an inbound data message corresponding to the outbound data message. For example, in some embodiments the outbound data message is a packet belonging to an outbound flow, and the corresponding inbound data message is a packet belonging to a symmetric inbound flow.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Further, the term virtual machine (VM) may be used herein to refer to any instance of a data compute node (DCN) that operates in virtualization software, including VMs and containers which run within VMs. While the examples below refer to virtual machines, it should be understood that the invention should not be limited to any specific type of DCN.

FIG. 1 conceptually illustrates a host computer 100 of some embodiments that includes a PNIC 105 with multiple hardware queues 120. In addition, the host computer executes virtualization software 110 on top of which multiple virtual machines (VMs) (115) operate. In some embodiments, the virtualization software 110 includes both a network virtualization layer to interface with the PNIC 105 and a hypervisor that virtualizes the physical resources of the host computer 100 (e.g., memory, processors, etc.) for the VMs, while in other embodiments these are separate. Each VM 115 has a VNIC or VMKNIC to send and receive data messages via ports of the virtualization software 110. It should be understood that the PNIC 105 is a hardware component while the virtualization software 110 and VMs 115 are software components that use physical hardware resources of the host computer 100 such as processors and memory.

The PNIC 105 has multiple hardware transmit (TX) and receive (RX) queues 120 which are paired as noted above, so that inbound and outbound data messages using the same receive and transmit queue pair are processed using the same CPU or CPU core. In some embodiments, one TX/RX pair is designated as a default TX/RX queue pair. The PNIC also has a receive (RX) processing engine 125 for receiving incoming data messages from a wired or wireless link (not shown). This RX processing engine 125 is configured by a queue load balancer 127 in the virtualization software 110 in some embodiments to assign data messages for particular VMs to hardware receive queues with specific features supported by the PNIC 105.

In some embodiments, one of the features supported by the PNIC 105 is a load balancing feature to increase throughput to VMs. Such load balancing features distribute data messages for a single VM (e.g., a single destination address) among multiple hardware receive queues. An implementation of this technique in some embodiments is Receive Side Scaling (RSS), which uses a 5-tuple of Internet Protocol (IP) data message header fields that define a flow (e.g., source IP address, source port number, destination IP address, destination port number, and transport layer protocol) to assign data messages to different receive queues within a group of receive queues designated for the feature. When any VM (or more specifically, a VM's VNIC or VMKNIC) requests the feature, the RX processing engine 125 redirects a data message for that VM to the RSS engine 130. The RSS engine 130 maintains an indirection table 160 to allow reference to the selected receive queue based on a hash of the 5-tuple. In some embodiments, the indirection table 160 maps hash keys (e.g., the least significant bits of the hash values) to receive queue identifiers. This indirection table of some embodiments is described in further detail below.

Figures 2, 3:
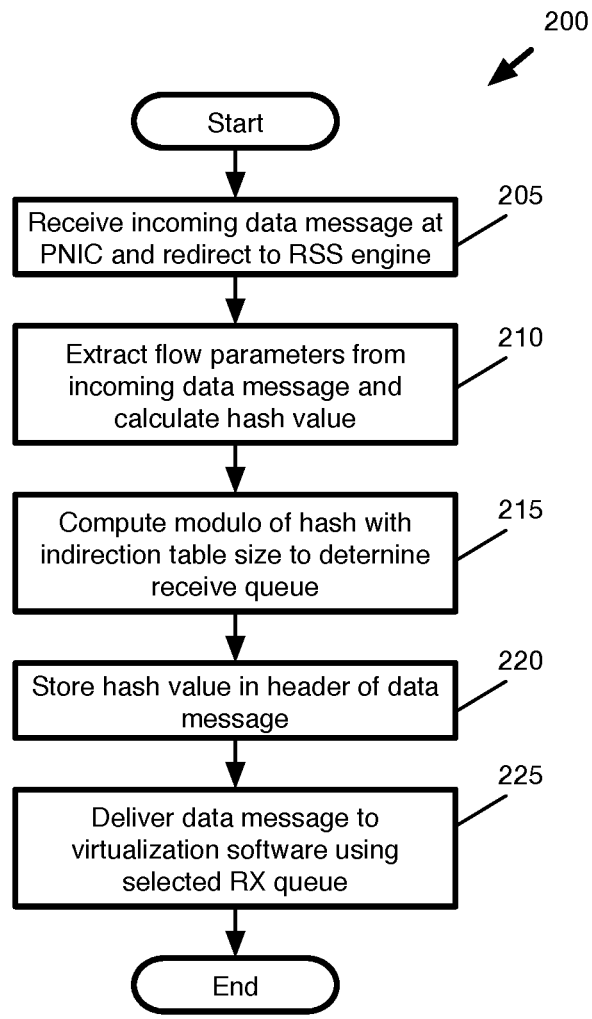
FIG. 2 conceptually illustrates a process of some embodiments performed by a PNIC to provide the Receive Side Scaling (RSS) feature.
FIG. 3 conceptually illustrates an indirection table of some embodiments.

FIG. 2 conceptually illustrates a process 200 of some embodiments performed by the PNIC 105 to provide the RSS feature for a requesting VM 115. As shown, the process begins by receiving (at 205) an incoming data message at the PNIC and redirecting this data message to the RSS engine. In some embodiments, the RX processing engine 125 receives this data message and, based on a filter configured by the virtualization software, provides the data message to an RSS engine 130 that assigns data messages to specific receive queues from a group of the receive queues 120. The filter at the RX processing engine 125 is configured by the queue load balancer 127 in some embodiments, based on a request from a VM (to which the received data message is addressed) to use the RSS feature for data messages to that VM.

Next, the process 200 extracts (at 210) flow parameters from the incoming data message and uses these flow parameters to calculate a hash value for the data message. In some embodiments, the RSS engine 130 extracts the commonly used flow 5-tuple (source and destination IP addresses, source and destination port numbers, and transport protocol) and calculates a hash from these values (e.g., using the Toeplitz hash algorithm). Using the flow 5-tuple ensures that all of the data messages for a particular flow are sent to the same receive queue, but that different flows for one VM will be distributed among the receive queues 120 in the group of RSS queues.

Using this hash value, the process 200 computes (at 215) a modulo of the hash with a size of the indirection table to determine a receive queue index for the data message. As mentioned, the indirection table is used by the RSS engine 130 to determine the receive queue for a data message. In some embodiments, the RSS engine 130 computes a hash key as the hash value modulo the size of the indirection table, and the indirection table maps these hash keys to receive queue indices. The output of this operation provides a queue index which corresponds to a receive queue.

FIG. 3 conceptually illustrates an indirection table 300 of some embodiments. In this case, the RSS engine load balances data messages across four receive queues (0-3) and the indirection table has sixteen entries (0-15). As the size of the indirection table is a power of 2, the modulo operation effectively identifies the least significant bits of the hash value (in this case, the four least significant bits), which serve as the hash key. In the indirection table 305, each of the four receive queues has four hash keys that map to that receive queue. However, the PNIC can adjust the receive queue indices in the indirection table if one of the queues in the group of RSS queues is overloaded (e.g., by changing one or more of the rows that maps to the overloaded queue to map instead to one of the other queues). That is, the indirection table does not have to be equally balanced between the receive queues at all times. In some embodiments, whenever the PNIC updates the indirection table, this updated table is provided to the virtualization software, as shown in FIG. 1.

Returning to FIG. 2, the process 200 stores (at 220) the calculated hash value for the data message in the data message header (e.g., in a reserved portion of an encapsulation header) or in metadata associated with the data message. In some embodiments, the virtualization software uses the hash value stored with the data message to update a flow cache table. Such embodiments are described further below.

Finally, the process 200 delivers (at 225) the data message to the virtualization software using the determined receive queue. The process then ends. The virtualization software of some embodiments performs additional forwarding, security processing, etc. before delivering the data message to the appropriate destination VM 115.

The virtualization software 110 illustrated in FIG. 1 executes on the host computer 100 and facilitates traffic to and from the VMs 115 through the shared PNIC 105. The virtualization software 110 includes (1) a VNIC emulator 135 and an IO chain 140 for each VM, (2) a software forwarding element 145, and (3) a network scheduler 150.

Each IO chain 140, in some embodiments, connects to its corresponding VM through its VNIC emulator 135 and connects to the software forwarding element 145. IN some embodiments, the software forwarding element 145 maintains a single port for each VNIC 115, through which it connects to the corresponding IO chain 140. The software forwarding element 145 performs data message processing operations to forward data messages received on one of its ports to another one of its ports. For example, in some embodiments, the software forwarding element 145 uses the data message headers to match a data message to flow based rules, and upon finding a match, performs the action specified by the matching rule.

The I/O chain 140 includes a series of modules that perform a series of tasks on each data message. As described in U.S. Pat. No. 9,548,965, which is hereby incorporated by reference, two examples of I/O chain modules are ARP and DHCP proxy modules that resolve ARP and DHCP broadcast messages without resorting to broadcasting these messages. Other examples of the processes performed by the modules in the I/O chain include firewall and traffic tunneling operations.

In some embodiments, kernel-level threads 155 manage the VNIC emulator 135 and the modules in the I/O chain 140. These threads also manage the PNIC hardware queues 120 that are associated with each corresponding VM. In some embodiments, each thread 155 is executed by one of the cores of a multi-core processor(s) (not shown) of the host computer.

As mentioned above, the virtualization software also includes a queue load balancer 127 and a network scheduler 150 that is interposed between the software forwarding element 145 and the PNIC 105 in some embodiments. The queue load balancer 127 of some embodiments is responsible for configuring the filters on the RX processing engine 125 in order to determine to which queue (or group of queues, in the case of RSS) the RX processing engine 125 directs data messages for each VM 115. In addition, in some embodiments, the PNIC driver exposes the indirection table 160 to the virtualization software 110, allowing the virtualization software 110 to load balance the hardware receive side queues using RSS. This allows the queue load balancer 127 to modify the indirection table as needed in order to balance the load across the queues in an RSS group (rather than the PNIC initiating these changes). The queue load balancer 127 publishes these changes to the indirection table 160 to the PNIC 105 (i.e., via the PNIC driver).

Figure 4:
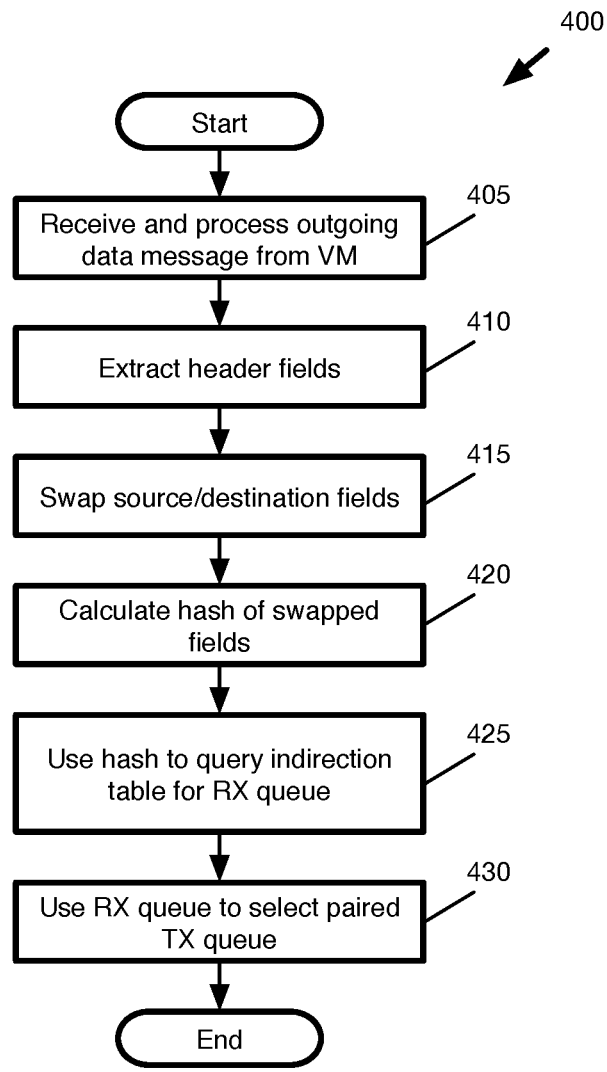
FIG. 4 conceptually illustrates a process of some embodiments performed by the virtualization software to select a transmit queue for an outgoing data message using the indirection table.

The network scheduler 150 of some embodiments includes a hash calculator 155 in some embodiments, used to help the network scheduler 150 select the transmit side queues for outgoing data messages. FIG. 4 conceptually illustrates a process 400 of some embodiments performed by the virtualization software 110 to select a transmit queue for an outgoing data message originating from one of the VMs 115. As shown, the process begins by receiving (at 405) and processing an outgoing data message from the VM. In some embodiments, the IO chain 140 modules perform various operations on the data message, and the software forwarding element 145 performs switching, routing, etc. operations for the data message and delivers the data message to the network scheduler 150. In some embodiments, this processing also determines that the data message belongs to a flow for which RSS is used by the PNIC, and therefore a flow for which a hash value is required to determine the appropriate transmit queue.

Next, the process 400 extracts (at 410) a set of header fields from the outgoing data message. In some embodiments, the network scheduler 150 extracts the commonly used flow 5-tuple (source and destination IP addresses, source and destination port numbers, and transport protocol), which are the same header fields used by the RSS engine 130 for incoming data messages.

The process 400 then swaps (at 415) the values in the source and destination fields of the extracted header values (the actual outgoing data message is not modified, just the extracted copies of the fields). For instance, when the 5-tuple is extracted, the source and destination IP addresses are swapped with each other, as are the source and destination port numbers. The process 400 then uses (at 420) these modified header values (with the source and destination addresses swapped) to calculate a "reverse" hash for the data message. Because the source and destination information are swapped, this flow 5-tuple (and therefore the hash) corresponds to that of an inbound data message for the data flow. The same hash algorithm as that used by the RSS engine (e.g., the Toeplitz hash algorithm) is used to calculate the reverse hash, to ensure that the hashes match.

Next, the process 400 uses (at 425) the reverse hash to query the indirection table stored in the virtualization software for a receive queue. As the indirection table 160 used by the network scheduler 150 is kept up-to-date with the indirection table used by the RSS engine 130, this query will identify the receive queue to which the RSS engine 130 assigns corresponding incoming data messages.

Based on this identified receive queue, the process 400 selects (at 430) the paired transmit queue for the outgoing data message. The process then ends. By using the transmit queue that is paired with the receive queue used for the corresponding incoming data message, the data messages in both directions for a flow will be assured of being processed by the same CPU, providing a cache locality benefit.

The above process for selecting a transmit queue requires that the reverse hash be calculated for every outbound data message (at least for flows that use RSS). However, some embodiments use a technique that does not require recomputation of the reverse hash for each outgoing data message, instead using a flow cache table that stores this information.

Figure 5:
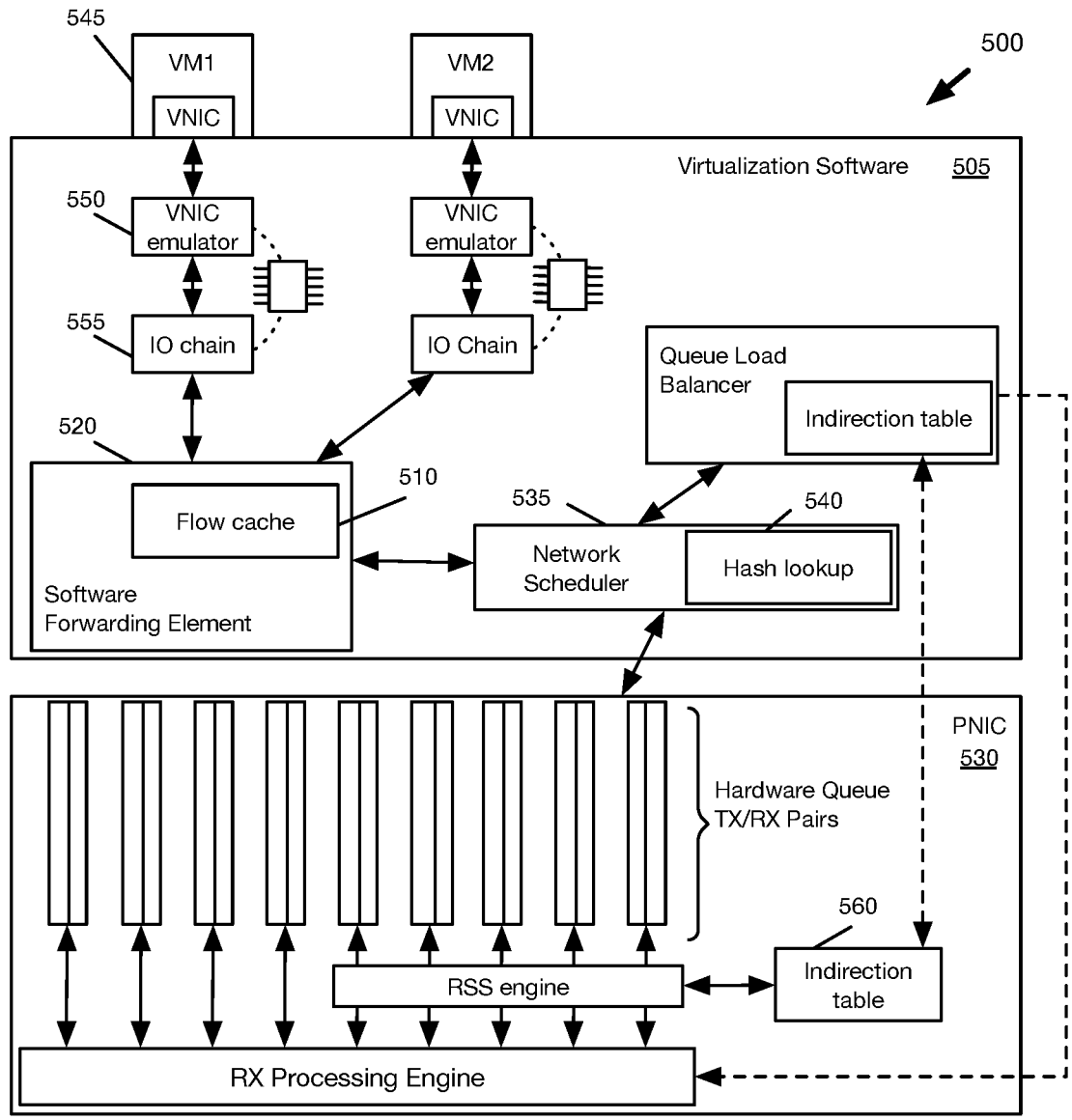
FIG. 5 conceptually illustrates a host computer of some embodiments that stores a flow cache table for facilitating the reverse hash lookup.

FIG. 5 conceptually illustrates a host computer 500 of some embodiments that stores such a flow cache table 525 for facilitating the reverse hash lookup. This host computer 500 has similar components to the host computer 100 illustrated in FIG. 1 (e.g., PNIC 530 with RSS engine, virtualization software 505 with the same data message pipeline between the network scheduler 535 and the VMs 545). In addition, the PNIC 530 performs the same process 200 described above and provides its indirection table 560 to the network scheduler 535 (as mentioned, in some embodiments, the queue load balancer modifies the indirection table 160 and provides the table to the PNIC 530).

In addition to the components described above, the virtualization software 505 also includes a flow cache 510. In some embodiments, as shown in this figure, the software forwarding element 520 stores flows in the flow cache to perform data message processing operations (e.g., by caching operations to perform on specific flows rather than performing full routing and forwarding operations on each data message in a flow). In other embodiments, the flow cache 510 is a separate table used only by the network scheduler 535 for determining transmit queues. In some embodiments, the flow cache is used to cache information about each flow as well as the hash value for the flow (or at least the hash key).

Figure 6:
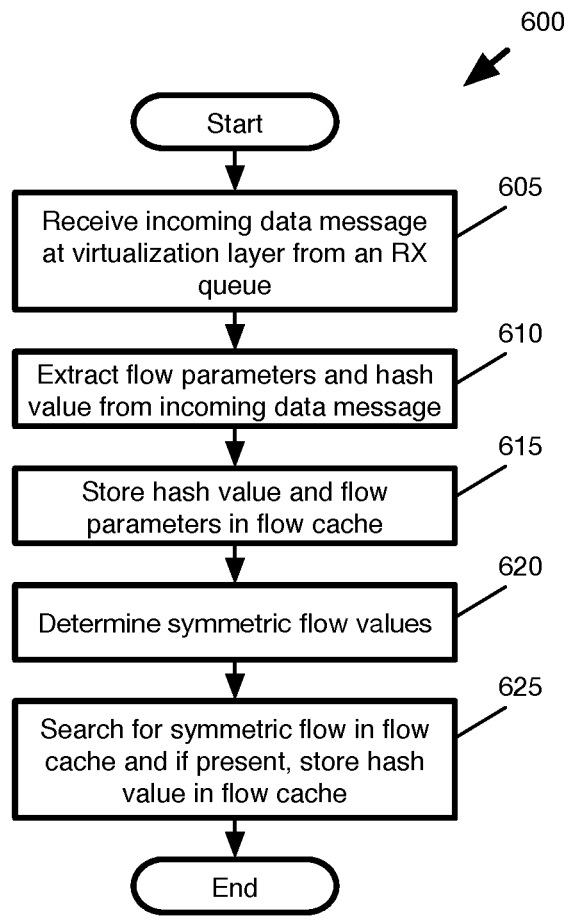
FIG. 6 conceptually illustrates a process of some embodiments performed by the virtualization software to populate the flow cache upon receiving an incoming data message.

FIG. 6 conceptually illustrates a process 600 of some embodiments for populating the flow cache upon receiving an incoming data message. In some embodiments, the process 600 is performed by the virtualization software 505 (e.g., by the network scheduler 535 and/or the forwarding element 520). As shown, the process 600 begins by receiving (at 605) an incoming data message from a receive queue. As described above, in some embodiments the PNIC has stored the hash value in the metadata (e.g., a specific data message header field) of the data message.

Next, the process 600 extracts (at 610) the flow parameters and the stored hash value from the data message. In some embodiments, the flow parameters are the 5-tuple described above that includes the source and destination IP addresses, the source and destination port numbers, and the transport protocol. The process 600 stores (at 615) the hash value and the extracted flow parameters in an entry of the flow cache. In some embodiments, the network scheduler 535 only performs these operations for the first data message of each flow, so that the same data is not stored in numerous entries. For instance, the network scheduler 535 verifies that the hash value is not already stored in an entry of the flow cache in some embodiments. If the hash value is already stored, then in some embodiments the network scheduler 535 ends the process without storing any new entries. In some embodiments, as mentioned, the flow cache 510 is maintained by the software forwarding element 520. In some such embodiments, the forwarding element 520 creates a new flow entry upon receipt and processing of the data message. This flow entry includes the flow parameters, a hash computed by the forwarding element and used by the forwarding element for matching subsequent data messages to the flow entry (which may be a different hash from the hash extracted from the data message, or the same hash), and actions for the forwarding element to take on subsequent data messages in the flow. In some embodiments, once the flow entry is created, the virtualization software stores the extracted hash with that flow entry.

In addition to storing the hash with the flow parameters for the incoming data message, the process 600 determines (at 620) the symmetric flow parameters for the data message. That is, in some embodiments the network scheduler 535 swaps the source flow parameters with the destination flow parameters (e.g., by swapping the source IP address and source port number with the destination IP address and destination port number, respectively). The process 600 searches (at 625) for the resulting symmetric flow in another entry of the flow cache, and if present, also stores (at 625) the hash value with the symmetric flow parameters in the flow cache. The process then ends. That is, each hash value is stored twice, once for the incoming flow parameters and once for the corresponding outgoing (symmetric) flow parameters. However, if the symmetric flow parameters are not present (e.g., because the received data message is the initiation of a data flow and no symmetric flow data messages have been yet sent), then the hash is not stored for the symmetric (outbound) flow entry in the cache, as the network scheduler cannot create this entry in the software forwarding element cache. On the other hand, if the flow cache is separate from the software forwarding element and maintained by the network scheduler, then the network scheduler can create the symmetric entry in the flow cache.

Figure 7:
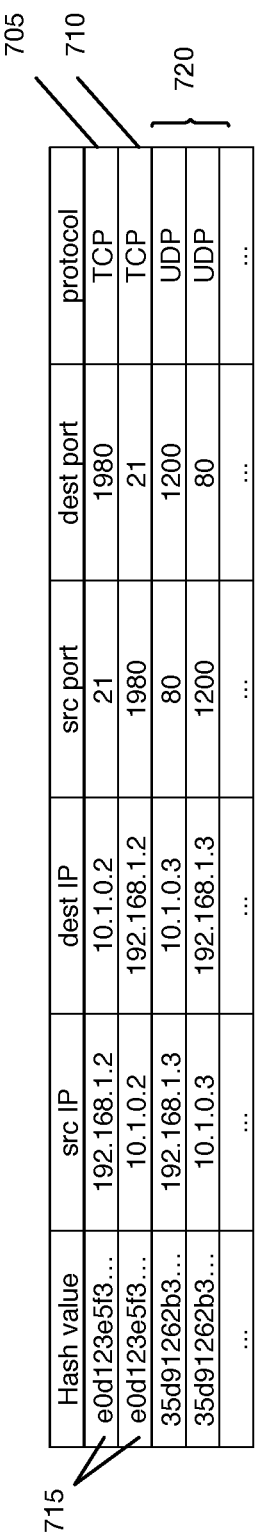
FIG. 7 conceptually illustrates an example flow cache of some embodiments.

FIG. 7 conceptually illustrates an example flow cache of some embodiments. As shown, the flow cache stores hash values mapped to 5-tuples (source IP address, destination IP address, source port, destination port, and transport layer protocol). The first entry 705 is a TCP flow for incoming data messages from sent from a machine with IP address 192.168.1.2 using source port 21 and destination port 1980, and addressed to a VM (on the local host computer) having IP address 10.1.0.2. The second entry 710 describes the corresponding reverse direction flow, with the source and destination information swapped. Both the first and second entries have the same stored hash value 715. Similarly, the subsequent two rows 720 depict a different flow (addressed to a different VM on the host machine) and its corresponding symmetric flow. In some embodiments, the flow cache stores additional fields related to each flow and symmetric flow (e.g., outer encapsulation parameters, etc.), as well as actions for the forwarding element to take on data messages that match that flow.

Accordingly, the flow cache table 525 associates each flow and its symmetric flow with the same hash value. Since the flow parameters are for inbound data messages, the symmetric flow parameters represent the corresponding outbound data messages. The hash value stored in the flow cache table 525 for a given flow/symmetric flow is therefore identical to the reverse hash calculated after swapping the source and destination fields of an outbound packet. This allows the virtualization software to use this information in the flow cache rather than computing the hash value for each outgoing data message, thereby reducing processing time.

Figure 8:
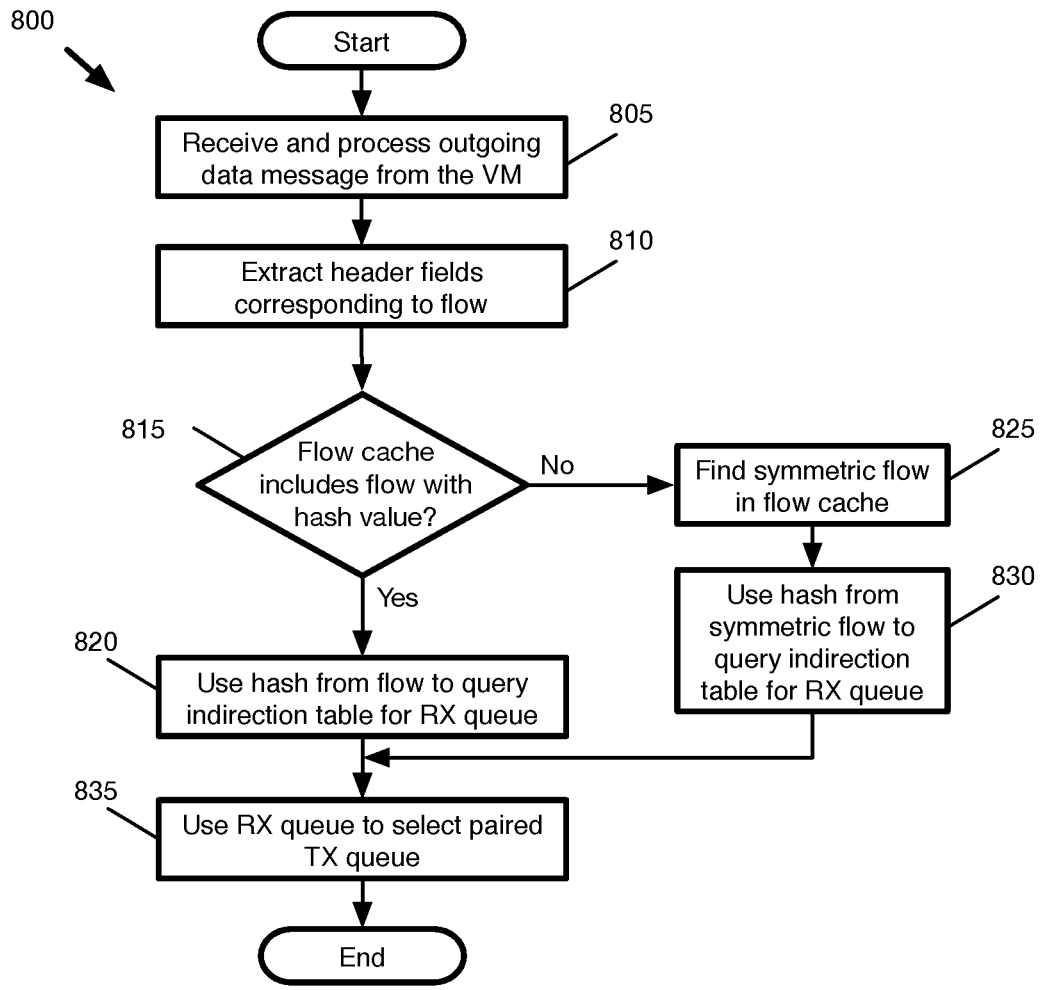
FIG. 8 conceptually illustrates a process of some embodiments performed by the virtualization software to select a transmit queue for an outbound data message using the flow cache.

FIG. 8 conceptually illustrates a process 800 of some embodiments for selecting a transmit queue for an outbound data message (e.g., originating from a VM). In some embodiments, the process 800 is performed by the virtualization software 505 using the flow cache 510. As shown, the process begins by receiving (at 805) and processing an outgoing data message from the VM. In some embodiments, the IO chain 555 modules perform various operations on the data message, and the software forwarding element 520 performs switching, routing, etc. operations for the data message (storing a new flow entry in the flow cache if the data message is the first outgoing data message in the flow) and delivers the data message to the network scheduler 535. In some embodiments, this processing also determines that the data message belongs to a flow for which RSS is used by the PNIC, and therefore a flow for which a hash value is required to determine the appropriate transmit queue.

Next, the process 800 extracts (at 810) a set of header fields from the outgoing data message corresponding to the data message flow. In some embodiments, the network scheduler 150 extracts the commonly used flow 5-tuple (source and destination IP addresses, source and destination port numbers, and transport protocol), which are the same header fields used by the RSS engine 130 for incoming data messages and stored in the flow cache 510.

The process then determines (at 815) whether the flow cache includes a flow entry for the set of parameters that includes a hash value for use by the network scheduler. In some embodiments, a hash lookup module 540 of the network scheduler 535 performs this lookup by searching the flow cache 510 for a matching set of flow parameters. In some embodiments, the flow cache may either not include a flow entry or include a flow entry that does not have a corresponding RSS hash value stored.

If the flow and hash are present in the flow cache, the process 800 uses (at 820) the retrieved hash to query the indirection table stored in the virtualization software for a receive queue. As the indirection table used by the network scheduler 535 is kept up-to-date with the indirection table used by the RSS engine of the PNIC 530, this query will identify the receive queue to which the RSS engine assigns corresponding incoming data messages.

On the other hand, if the flow and hash are not present in the flow cache, the process 800 finds (at 825) the symmetric flow corresponding to an inbound data message in the flow cache. The network scheduler 535 swaps the source and destination header fields in the extracted flow parameters and identifies this symmetric flow in the flow cache. The flow and/or hash value might not be present in the cache for various reasons. For instance, in some embodiments if the VM 545 is acting as a TCP server that receives data messages from a TCP client, then the flow entry might not be present in the flow cache.

In this case, the process 800 uses (at 830) the retrieved hash (from the symmetric flow) to query the indirection table stored in the virtualization software for a receive queue. As the indirection table used by the network scheduler 535 is kept up-to-date with the indirection table used by the RSS engine of the PNIC 530, this query will identify the receive queue to which the RSS engine assigns corresponding incoming data messages Based on the identified receive queue, the process 800 uses (at 835) the identified receive queue to select the paired transmit queue for the outgoing data message. The process then ends. By using the transmit queue that is paired with the receive queue used for the corresponding incoming data message, the data messages in both directions for a flow will be assured of being processed by the same CPU, providing a cache locality benefit.

In some embodiments, either the outbound or inbound flow will always be present in the flow cache. However, in other embodiments (e.g., if the flow cache is not maintained by the software forwarding element and is instead maintained separately by the network scheduler 535), then in certain cases neither the outgoing or the incoming flow will be stored in the flow cache (e.g., for the first outgoing data message of a connection initiated by the VM). In such situations, the network scheduler 535 of some embodiments selects a default transmit queue for the data message.

Figure 9:
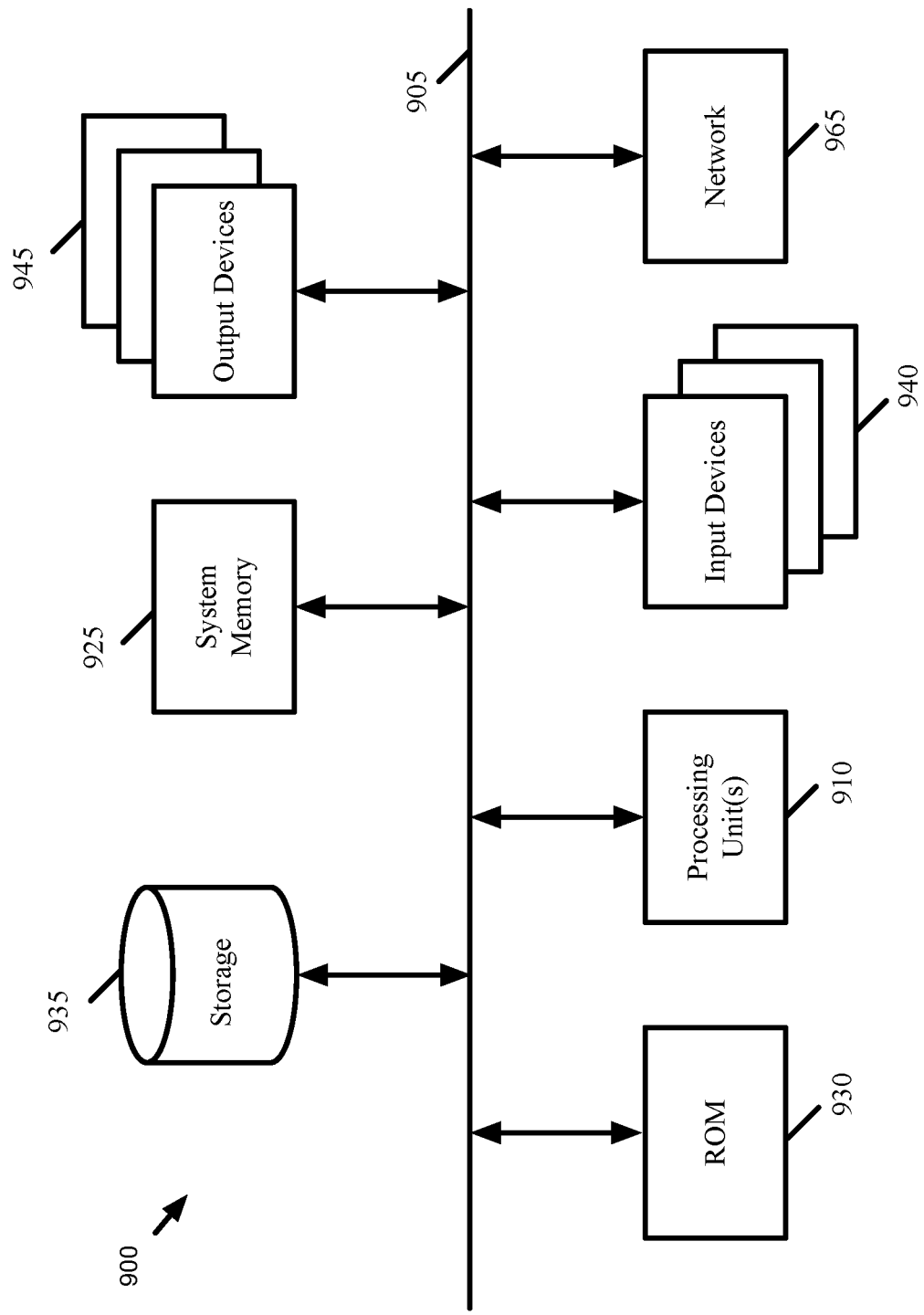
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such as random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for selecting a transmit queue of a network interface card (NIC) of a host computer for an outbound data message, the NIC comprising a plurality of transmit queues and a plurality of receive queues, wherein each of the plurality of transmit queues is individually associated with a different receive queue of the plurality of receive queues, wherein the NIC performs a load balancing operation to distribute inbound data messages among multiple receive queues, the method comprising:
    extracting a set of header values from a header of the outbound data message;
    using the extracted set of header values to identify a receive queue which the NIC would select for a corresponding inbound data message upon which the NIC performed the load balancing operation; and
    selecting a transmit queue associated with the identified receive queue to process the outbound data message.

2. The method of claim 1, wherein the NIC performs the load balancing operation for a particular inbound data message by:
    extracting a particular set of header values from a header of the particular inbound data message;
    calculating a hash value from the particular set of header values; and
    selecting a receive queue from a set of the receive queues for the particular inbound data message based on the calculated hash value.

3. The method of claim 2, wherein the NIC identifies the set of receive queues based on a destination address of the particular inbound data message.

4. The method of claim 2, wherein the NIC (i) stores the hash value and an identifier for the selected receive queue in a table and (ii) stores the hash value in the header of the particular inbound data message.

5. The method of claim 4, wherein the NIC selects the receive queue by performing a modulo operation of the hash value with a maximum number of possible entries in the table.

6. The method of claim 5, wherein the maximum number of possible entries in the table is greater than a number of receive queues in the set of receive queues.

7. The method of claim 4, wherein the calculated hash value is a first hash value, wherein using the extracted set of header values to identify the receive queue comprises:
    mapping the extracted set of header values from the outbound data message to header values of the corresponding inbound data message;
    calculating a second hash value from the mapped set of header values; and
    querying the table to identify a receive queue associated with the calculated second hash value.

8. The method of claim 7, wherein the extracted set of header values comprises source and destination information, wherein mapping the extracted set of header values to header values of the corresponding inbound data message comprises swapping the source and destination information.

9. The method of claim 8, wherein the source and destination information comprise at least one of Internet Protocol (IP) addresses and transport layer ports.

10. The method of claim 4, wherein the table is a first table and the calculated hash value is a first hash value, wherein using the extracted set of header values to identify the receive queue comprises:
    querying a second table to identify a second hash value associated with the extracted set of header values; and
    querying the first table to identify a receive queue associated with the identified second hash value.

11. The method of claim 10 further comprising populating a first entry in the second table by:
    extracting the hash value and the particular set of header values from the header of the particular inbound data message; and
    storing the extracted hash value and the particular set of header values in the first entry.

12. The method of claim 11, wherein the particular set of header values comprises source and destination information for the particular inbound data message, the method further comprising populating a second entry in the second table by:
    modifying the particular set of header values by swapping the source and destination information; and
    storing the extracted hash value and the modified set of header values in the second entry.

13. The method of claim 1, wherein each pair of associated transmit and receive queues are executed on a same processing unit of the host computer.

14. The method of claim 1, wherein the outbound data message originates from a data compute node (DCN) executing on the host computer.

15. A non-transitory machine readable medium storing a program which when executed by at least one processing unit of a host computer selects a transmit queue of a network interface card (NIC) of the host computer for an outbound data message, the NIC comprising a plurality of transmit queues and a plurality of receive queues, wherein each of the plurality of transmit queues is individually associated with a different receive queue of the plurality of receive queues, wherein the MC performs a load balancing operation to distribute inbound data messages among multiple receive queues, the program comprising sets of instructions for:

extracting a set of header values from a header of the outbound data message, the outbound data message to be transmitted from the host computer to a network via the NIC;

using the extracted set of header values to identify a receive queue which the NIC would select for a corresponding inbound data message, received from the network at the host computer via the NIC, upon which the NIC performed the load balancing operation; and selecting a transmit queue associated with the identified receive queue to process the outbound data message.

16. The non-transitory machine readable medium of claim 15, wherein the NIC performs the load balancing operation for a particular inbound data message, received from the network at the host computer via the NIC, by:

extracting a particular set of header values from a header of the particular inbound data message;

calculating a hash value from the particular set of header values; and selecting a receive queue from a set of the receive queues for the particular inbound data message based on the calculated hash value.

17. The non-transitory machine readable medium of claim 16, wherein the MC (i) stores the hash value and an identifier for the selected receive queue in a table and (ii) stores the hash value in the header of the particular inbound data message.

18. The non-transitory machine readable medium of claim 17, wherein the NIC selects the receive queue by performing a modulo operation of the hash value with a maximum number of possible entries in the table, wherein the maximum number of possible entries in the table is greater than a number of receive queues in the set of receive queues.

19. The non-transitory machine readable medium of claim 17, wherein the calculated hash value is a first hash value, wherein the set of instructions for using the extracted set of header values to identify the receive queue comprises sets of instructions for:

mapping the extracted set of header values from the outbound data message to header values of the corresponding inbound data message;

calculating a second hash value from the mapped set of header values; and querying the table to identify a receive queue associated with the calculated second hash value.

20. The non-transitory machine readable medium of claim 19, wherein the extracted set of header values comprises source and destination information, wherein the set of instructions for mapping the extracted set of header values to header values of the corresponding inbound data message comprises a set of instructions for swapping the source and destination information.

21. The non-transitory machine readable medium of claim 17, wherein the table is a first table and the calculated hash value is a first hash value, wherein the set of instructions for using the extracted set of header values to identify the receive queue comprises sets of instructions for:

querying a second table to identify a second hash value associated with the extracted set of header values; and querying the first table to identify a receive queue associated with the identified second hash value.

22. The non-transitory machine readable medium of claim 21, wherein the program further comprises a set of instructions for populating a first entry in the second table by:

extracting the hash value and the particular set of header values from the header of the particular inbound data message; and storing the extracted hash value and the particular set of header values in the first entry.

23. The non-transitory machine readable medium of claim 22, wherein the particular set of header values comprises source and destination information for the particular inbound data message, the program further comprising a set of instructions for populating a second entry in the second table by:

modifying the particular set of header values by swapping the source and destination information; and storing the extracted hash value and the modified set of header values in the second entry.

24. The non-transitory machine readable medium of claim 15, wherein each pair of associated transmit and receive queues are executed on a same processing unit of the host computer.

* * * * *